United States Patent
Hashimoto

(10) Patent No.: US 11,212,403 B2
(45) Date of Patent: Dec. 28, 2021

(54) SHEET POST-PROCESSING APPARATUS FOR AN IMAGE FORMING SYSTEM THAT ACCOUNTS FOR SHEET BINDING PROCESSING TIME

(71) Applicant: TOSHIBA TEC KABUSHIKI KAISHA, Tokyo (JP)

(72) Inventor: Yoshihisa Hashimoto, Gotemba Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/828,882

(22) Filed: Mar. 24, 2020

(65) Prior Publication Data
US 2021/0306493 A1    Sep. 30, 2021

(51) Int. Cl.
*G06F 3/12* (2006.01)
*H04N 1/00* (2006.01)

(52) U.S. Cl.
CPC ....... *H04N 1/00639* (2013.01); *H04N 1/0066* (2013.01); *H04N 1/00631* (2013.01); *H04N 1/00649* (2013.01)

(58) Field of Classification Search
CPC .......... H04N 1/00639; H04N 1/00631; H04N 1/00649; H04N 1/0066
USPC ......................................... 358/1.1–1.18, 474
See application file for complete search history.

(56) References Cited

U.S. PATENT DOCUMENTS

| | | | | |
|---|---|---|---|---|
| 2010/0245910 A1* | 9/2010 | Maeda | ................ | G06F 3/1229 358/1.15 |
| 2012/0069360 A1* | 3/2012 | Kawa | ................ | B65H 39/10 358/1.9 |
| 2016/0376120 A1* | 12/2016 | Ohta | ................ | B65H 37/04 270/1.01 |
| 2017/0034369 A1* | 2/2017 | Iwashima | ................ | G06F 3/1257 |

FOREIGN PATENT DOCUMENTS

JP        2007-076866 A    3/2007

* cited by examiner

*Primary Examiner* — Gabriel I Garcia
(74) *Attorney, Agent, or Firm* — Foley & Lardner LLP

(57) ABSTRACT

A sheet post-processing apparatus includes a control unit. When performing binding for binding a plurality of sheets a plurality of times continuously, the controller measures the processing time required for the binding during first binding and notifies an image forming apparatus of a post-processing time including the measured processing time.

17 Claims, 3 Drawing Sheets

SHEET POST-PROCESSING APPARATUS FOR AN IMAGE FORMING SYSTEM THAT ACCOUNTS FOR SHEET BINDING PROCESSING TIME

FIELD

Embodiments described herein relate generally to a sheet post-processing apparatus, an image forming system, and a notification method.

BACKGROUND

A sheet post-processing apparatus is provided which sequentially receives a sheet discharged from an image forming apparatus, stacks the sheet on a processing tray, and binds a plurality of sheets. Some of such sheet post-processing apparatuses include a mechanism in which a sheet bundle is generated by performing staple binding on predetermined binding portions of a plurality of sheets. In recent years, as the processing speed of an image forming apparatus is improved, the processing speed of a sheet post-processing apparatus is required to be improved.

DETAILED DESCRIPTION

However, in some sheet post-processing apparatuses, the post-processing time is calculated with the time required for the binding being the predetermined maximum time and then a notification is made to the image forming apparatus. An error may occur in the time determined for binding. Even when the binding is completed early, a waiting time may occur until the next post-processing is performed.

In general, according to one embodiment, a sheet post-processing apparatus includes a control unit (controller). When performing binding for binding a plurality of sheets a plurality of times continuously, the controller measures the processing time required for the binding during first binding and notifies an image forming apparatus of a post-processing time including the measured processing time.

Hereinafter, the sheet post-processing apparatus, an image forming system, and a notification method according to the embodiment will be described with reference to drawings.

Figure 1:
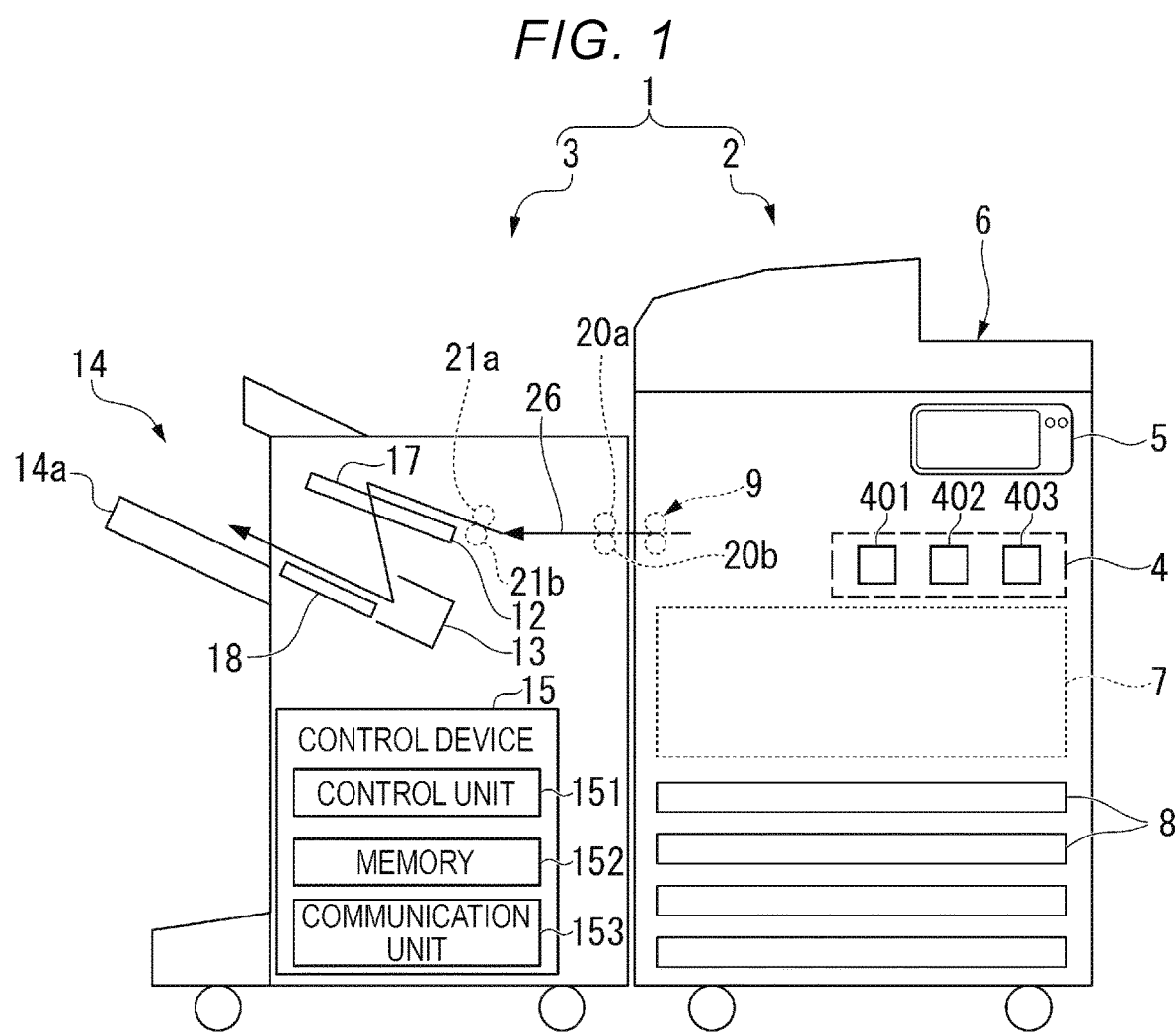
FIG. 1 is a schematic diagram illustrating an example of a hardware configuration of an image forming system according to at least one embodiment.

FIG. 1 is a schematic diagram illustrating an example of a hardware configuration of an image forming system 1 according to at least one embodiment.

The image forming system 1 includes an image forming apparatus 2 and a sheet post-processing apparatus 3.

The image forming apparatus 2 is, for example, a multifunction peripheral (MFP). The image forming apparatus 2 executes image forming and image fixing. The image forming is processing for forming an image on a sheet. The image formed on the sheet may be a toner image or an image formed by ink jet. The image fixing is processing for fixing the image formed on the sheet on the sheet. The sheet, for example, is a recording medium such as paper on which characters or images are formed. The sheet may be any material such that the image forming apparatus 2 can form an image thereon. The image forming apparatus 2 discharges the sheet to the sheet post-processing apparatus 3 when an instruction to execute post-processing is received.

The sheet post-processing apparatus 3 performs post-processing on a sheet conveyed from the image forming apparatus 2. The post-processing includes, for example, aligning, binding, folding, punching, stamping, discharging, and the like. In the following description, as an example of the post-processing, aligning, binding, and discharging will be described. The aligning is processing for arranging positions of ends of the plurality of sheets in a width direction and a length direction. During the aligning, the positions of the ends of the plurality of sheets in the width direction and the length direction are aligned. The length direction of the sheet is a direction perpendicular to the sheet width direction. The binding is processing for stacking and aligning a plurality of sheets in a bundle and combining the sheets into one bundle by a binding unit such as a stapler. The discharging is processing for discharging the post-processed sheets. For example, in the discharging, the plurality of sheets combined into one bundle by the binding are discharged.

Next, specific configurations of the image forming apparatus 2 and the sheet post-processing apparatus 3 will be described. The image forming apparatus 2 includes a control device (image forming controller) 4, a control panel 5, a scanner unit (scanner) 6, a printer unit (printer) 7, a sheet feeding unit (feeder) 8, and a sheet discharge unit (discharger) 9.

The control device 4 includes a control unit 401, a memory 402, and a communication unit 403. The control unit 401 is, for example, a processor such as a central processing unit (CPU) or a graphics processing unit (GPU). The control unit 401 controls the operation of each functional unit of the image forming apparatus 2. The control unit 401 executes various kinds of processing by loading and executing a program stored in a read only memory (ROM) in a random access memory (RAM). An application specific integrated circuit (ASIC) may have an appropriate function realized by the control unit 401. The ASIC is a dedicated circuit for realizing a specific function.

For example, the control unit 401 controls the sheet post-processing apparatus 3 to discharge the sheets at a timing when the post-processing time notified from the sheet post-processing apparatus 3 elapses. Here, the post-processing time is a time required for the sheet post-processing apparatus 3 to perform post-processing. For example, the post-processing time is a time obtained by adding the time required for each of at least the aligning, the binding, and the discharging to a sheet discharge tray.

The memory 402 is a memory that temporarily stores data used by each functional unit included in the image forming apparatus 2. The memory 402 is, for example, a RAM.

The communication unit 403 is a communication interface for transmitting and receiving data to and from an external apparatus. The communication unit 403 communicates with the sheet post-processing apparatus 3, for example. The communication unit 403 transmits information on the type of post-processing (hereinafter, referred to as "post-processing information") to the sheet post-processing apparatus 3. The post-processing information includes information on the type of post-processing (for example, binding), the number of copies, and the number of sheets for each number of post-processed copies. The communication unit 403 receives information on the post-processing time from the sheet post-processing apparatus 3 (hereinafter, referred to as "post-processing time information"). The communication unit 403 outputs the received post-processing time information to control unit 401.

The control panel 5 includes a display unit and an operation unit. The display unit is a display device such as a liquid crystal display and an organic electro luminescence (EL) display. The display unit displays various pieces of information on the image forming apparatus 2 in accordance with the control of the control device 4. The operation unit includes a plurality of buttons. The operation unit receives a user operation. For example, the operation unit receives an input of a print execution instruction and an instruction regarding a type of sheet post-processing. The operation unit outputs a signal corresponding to the operation performed by the user to the control device 4. The display unit and the operation unit may be configured as an integrated touch panel.

The scanner unit 6 reads an image to be read on a document based on brightness and darkness of light. For example, the scanner unit 6 reads an image printed on a sheet to be read set on a document reading table. The scanner unit 6 records the image information read by the scanner unit 6. The recorded image information may be transmitted to another information processing apparatus via a network. The recorded image information may be formed on the sheet as an image by the printer unit 7 as print data.

The printer unit 7 executes image forming and image fixing. The printer unit 7 forms an image on a sheet based on the image information generated by the scanner unit 6 or the image information received via a communication path, for example. The printer unit 7 applies heat and pressure to the image formed on the sheet to fix the image on the sheet.

The sheet feeding unit 8 supplies sheets to the printer unit 7 one by one in accordance with the timing when the printer unit 7 forms an image. The sheet discharge unit 9 discharges a sheet discharged from the printer unit 7 to the sheet discharging unit or the sheet post-processing apparatus 3. For example, when an instruction to execute post-processing is input to the image forming apparatus 2, the sheet discharge unit 9 discharges the sheet to the sheet post-processing apparatus 3. On the other hand, when an instruction to execute post-processing is not input to the image forming apparatus 2, the sheet discharge unit 9 discharges the sheet to the sheet discharge tray.

Next, the configuration of the sheet post-processing apparatus 3 will be described.

As illustrated in FIG. 1, the sheet post-processing apparatus 3 is located at a location adjacent to the image forming apparatus 2. The sheet post-processing apparatus 3 performs post-processing specified through the control panel 5 on the sheet conveyed from the image forming apparatus 2.

The sheet post-processing apparatus 3 includes a standby unit 12, a processing unit 13, a discharge unit 14, and a control device 15.

The standby unit 12 temporarily retains (buffers) the sheet conveyed from the image forming apparatus 2. The standby unit 12 includes a standby tray 17. For example, while the post-processing of a preceding sheet is performed by the processing unit 13, the standby unit 12 causes a plurality of subsequent sheets to wait on the standby tray 17. The standby unit 12 causes the sheets to be on standby by stacking the sheets on the standby tray 17. The standby unit 12 is located above the processing unit 13. When the post-processing by the processing unit 13 is completed, the standby unit 12 drops the plurality of retained sheets toward the processing unit 13. More specifically, the standby unit 12 drops the plurality of retained sheets toward a processing tray 18 included in the processing unit 13. The processing tray 18 places a plurality of sheets to be post-processed.

The processing unit 13 post-processes the plurality of sheets placed on the processing tray 18 according to an instruction from the control unit 151. More specifically, first, the processing unit 13 aligns the plurality of sheets. Thereby, the plurality of sheets are aligned. The processing unit 13 post-processes the plurality of aligned sheets. For example, the processing unit 13 performs binding using a stapler. The processing unit 13 discharges the plurality of the post-processed sheets to the discharge unit 14.

As illustrated in FIG. 1, a movable tray 14a is located on the side of the sheet post-processing apparatus 3. The movable tray 14a is vertically movable along the side of the sheet post-processing apparatus 3. Sheets are discharged from the standby unit 12 and the processing unit 13 to the movable tray 14a.

The control device 15 includes a control unit 151, a memory 152 (storage unit), and a communication unit 153. The control unit 151 is, for example, a processor such as a CPU or a GPU. The control unit 151 controls the operation of each functional unit of the sheet post-processing apparatus 3. The control unit 151 executes various kinds of processing by loading and executing the program stored in the ROM in the RAM. The control unit 151 may have an appropriate function realized by an ASIC.

The memory 152 is a memory that temporarily stores data used by each functional unit included in the sheet post-processing apparatus 3. The memory 152 stores, for example, a processing time and post-processing information obtained by measurement. The memory 152 is, for example, a RAM.

The communication unit 153 is a communication interface for transmitting and receiving data to and from an external apparatus. The communication unit 153 performs communication with the image forming apparatus 2, for example. The communication unit 153 receives post-processing information from the image forming apparatus 2. The communication unit 153 transmits post-processing time information to the image forming apparatus 2. The communication unit 153 outputs the received post-processing time information to control unit 151.

Next, the processing performed by the control unit 151 will be specifically described.

When the binding is continuously performed a plurality of times, the control unit 151 measures the processing time during a first binding. Here, the case of being continuously performed a plurality of times is a case where post-processing is performed on a plurality of copies in one job. For example, when performing post-processing on three copies, the control unit 151 measures the processing time during the binding of the first copy. The control unit 151 notifies the image forming apparatus 2 of the post-processing time including the measured processing time.

The control unit 151 causes the stapler capable of binding a plurality of sheets to execute the binding without measuring the processing time in the second and subsequent binding of the continuous binding. If the processing time is not measured, the control unit 151 notifies the image forming apparatus of a post-processing time including a preset time as the processing time. The preset time refers to a maximum time that is assumed to be required for the stapler to perform the binding. The processing time required for the stapler to perform the binding differs between immediately after manufacturing of the post-processing apparatus and after being used for a predetermined period. This is because the binding by the stapler is not smooth immediately after the manufacture of the sheet post-processing apparatus 3, but becomes smooth after being used for the predetermined period. That is, it is assumed that the binding requires more time immediately after manufacturing than after the apparatus is used for the predetermined period. Therefore, a time that is assumed to be required for the stapler to perform the binding immediately after manufacturing is the maximum time.

When the processing time is not measured, after notifying the image forming apparatus 2 of the post-processing time including the maximum time as the processing time, the control unit 151 measures the processing time. The control unit 151 starts the measurement of the processing time at the timing when the stapler is instructed to execute the binding, and terminates the measurement of the processing time at the timing when the binding is completed. After the continuous binding is terminated, the control unit 151 deletes the processing time stored in the memory 152. The control unit 151 calculates the post-processing time by adding the time required for each of at least the sheet alignment, the binding, and the discharging to the sheet discharge tray.

The control device 15 controls, for example, the standby unit 12 and the processing unit 13. The control device 15 controls the operation of inlet rollers 20a and 20b and outlet rollers 21a and 21b to convey the sheet to the standby tray 17. The control device 15 controls the operation of the processing unit 13.

Hereinafter, a configuration of each unit of the sheet post-processing apparatus 3 will be described in more detail.

In the present embodiment, "upstream side" and "downstream side" mean the upstream side (the image forming apparatus 2 side) and the downstream side in the sheet conveyance direction. The "front end" and "rear end" mean the "downstream end" and the "upstream end" in the sheet conveyance direction, respectively. Further, in the present embodiment, a direction substantially parallel to the sheet plane (sheet surface direction) and substantially orthogonal to the sheet conveyance direction is referred to as a sheet width direction W.

Figure 2:
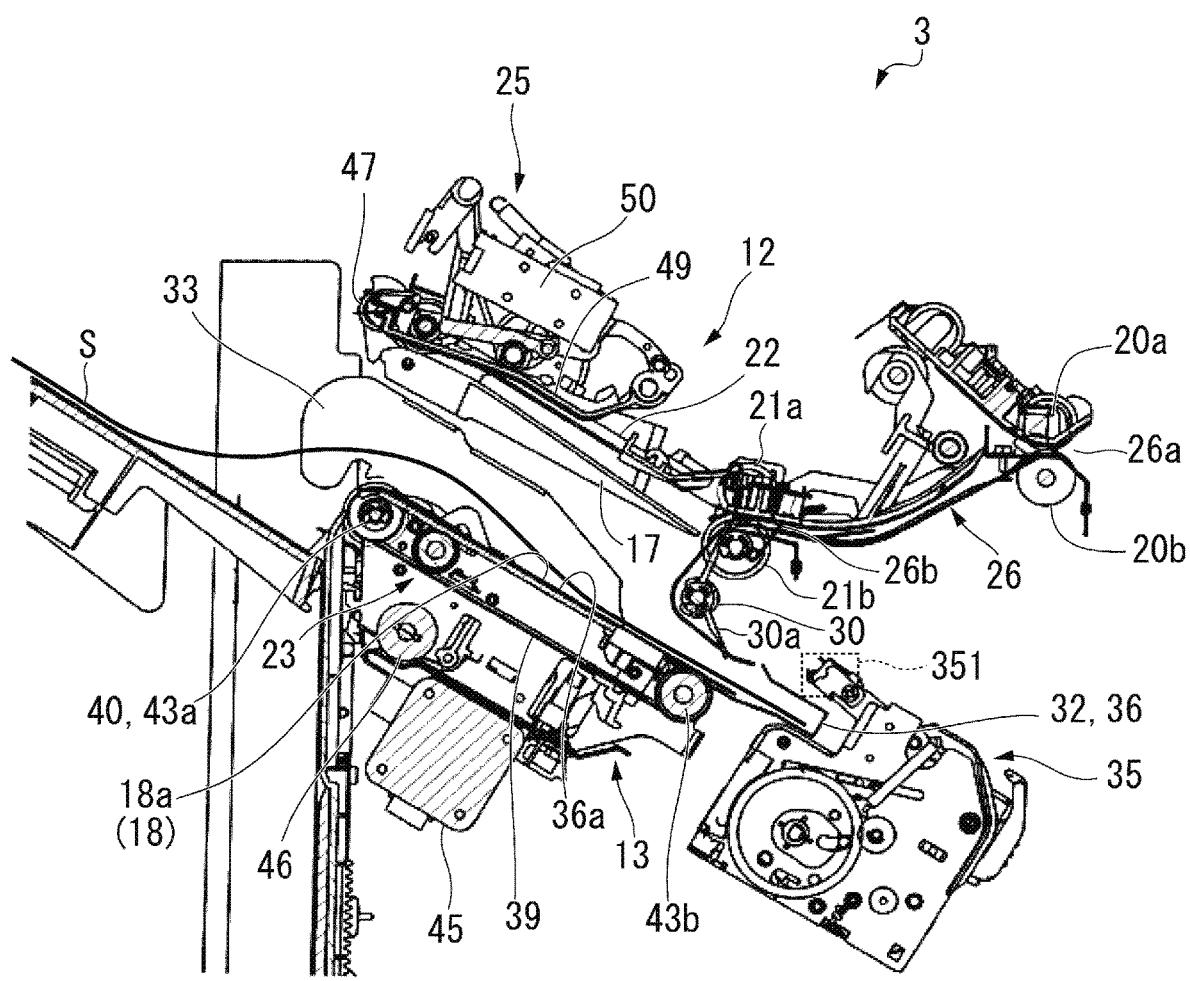
FIG. 2 is a schematic diagram illustrating an example of a hardware configuration of a sheet post-processing apparatus according to at least one embodiment.

FIG. 2 is a schematic diagram illustrating an example of a hardware configuration of the sheet post-processing apparatus 3 according to the embodiment.

As illustrated in FIG. 2, the sheet post-processing apparatus 3 includes the standby unit 12, the processing unit 13, a pinch roller driving mechanism. 25, and a conveyance path 26. The conveyance path 26 is provided inside the sheet post-processing apparatus 3. The conveyance path 26 includes a sheet supply port 26a provided with the inlet rollers 20a and 20b, and a sheet discharge port 26b provided with the outlet rollers 21a and 21b. The sheet supply port 26a faces the sheet discharge unit 9 of the image forming apparatus 2. The sheet is supplied from the image forming apparatus 2 to the sheet supply port 26a. The sheet discharge port 26b faces the standby unit 12. The sheet passing through the conveyance path 26 is conveyed to the standby unit 12 from the sheet discharge port 26b.

As illustrated in FIGS. 1 and 2, the conveyance path 26 guides the sheet to the standby unit 12. The conveyance path 26 extends toward a vertical alignment roller 40 (conveyance roller) in the processing unit 13 on the downstream side of the standby unit 12 in the conveyance direction.

In FIGS. 1 and 2, the inlet rollers 20a and 20b are provided near the sheet supply port 26a. The inlet rollers 20a and 20b are parallel to each other, and opposed to each other in the radial direction. The inlet roller 20a is a drive roller disposed on the upper surface side of the conveyance path 26. The inlet roller 20b is a driven roller disposed on the lower surface side of the conveyance path 26. The inlet rollers 20a and 20b sandwich the sheet in a nip between each other. The inlet rollers 20a and 20b convey the sandwiched sheet to a downstream side in the conveyance direction.

The outlet rollers 21a and 21b are provided near the sheet discharge port 26b. The outlet rollers 21a and 21b are parallel to each other, and opposed to each other in the radial direction. The outlet roller 21a is a driven roller disposed on the upper surface side of the conveyance path 26. The outlet roller 21b is a drive roller disposed on the lower surface side of the conveyance path 26. The outlet rollers 21a and 21b sandwich the sheet in a nip between each other. The outlet rollers 21a and 21b convey the sandwiched sheet to a downstream side in the conveyance direction.

The standby unit 12 includes the standby tray 17 and an assist guide 22. The rear end of the standby tray 17 is located near the outlet rollers 21a and 21b. The rear end of the standby tray 17 is located below the sheet discharge port 26b of the conveyance path 26. The standby tray 17 is inclined with respect to the horizontal direction so as to gradually ascend as the sheet moves downstream in the sheet conveyance direction. While the post-processing is performed by the processing unit 13, the standby tray 17 stacks a plurality of sheets and causes the sheets to be on standby.

The standby tray 17 includes a pair of tray members that can approach and separate from each other in the sheet width direction W. When a sheet is on standby in the standby tray 17, the pair of tray members approach each other and can support the sheet. When moving the sheet from the standby tray 17 to the processing tray 18, the pair of tray members are separated from each other, and the supported sheet is dropped toward the processing tray 18.

A paddle unit 30 is provided between the upstream side of the standby tray 17 and the upstream side of the processing tray 18. The paddle unit 30 presses the sheet toward the processing tray 18 by rotating about a rotation axis along the sheet width direction W. The paddle unit 30 presses the rear end of the sheet toward the processing tray 18 when the sheet moves from the standby tray 17 to the processing tray 18. The paddle unit 30 includes a paddle 30a formed of an elastic material such as rubber, and the rear end of the sheet is pressed against the processing tray 18 by the paddle 30a.

As illustrated in FIG. 2, the processing unit 13 includes the processing tray 18, a rear end stopper 32, a horizontal alignment plate 33, a stapler 35, an ejector 36, a truster 36a, a bundle claw (push-out member), a bundle claw belt 39, and a vertical alignment roller 40 (conveyance roller) and belt pulleys 43a and 43b.

The processing tray 18 is provided below the standby tray 17. The processing tray 18 is inclined with respect to the horizontal direction so as to gradually ascend as the sheet moves downstream in the sheet conveyance direction. The processing tray 18 is inclined substantially in parallel with the standby tray 17, for example. The processing tray 18 includes a conveyance surface 18a (on which the sheet is placed) for supporting the sheet.

A pair of horizontal alignment plates 33 are provided on both sides of the conveyance surface 18a of the processing tray 18 in the sheet width direction W. The pair of horizontal alignment plates 33 are provided apart from each other in the sheet width direction W. The horizontal alignment plates 33 are movable in a direction approaching each other and in a direction separating away from each other, in the sheet width direction W. The horizontal alignment plate 33 configures a horizontal alignment apparatus that performs alignment of a sheet in the sheet width direction W (so-called horizontal alignment).

The rear end stopper 32 is provided at the upstream end of the processing tray 18. The sheet placed on the processing tray 18 is conveyed toward the rear end stopper 32 by the vertical alignment roller 40 being driven to rotate reversely in the clockwise direction in the drawing. The vertical alignment roller 40 performs the vertical alignment of the sheet by cooperating with the paddle unit 30 to bring the upstream end of the sheet into contact with the rear end stopper 32. By driving the vertical alignment roller 40 to rotate forward in the counterclockwise direction in the drawing, the thin and lightweight sheet or the curved sheet is stretched in cooperation with the paddle unit 30 that presses the rear end of the sheet.

The stapler 35 is disposed behind the processing tray 18. The stapler 35 includes a staple clinch 351. The stapler 35 can clinch the end of the aligned sheet in contact with the rear end stopper 32. The stapler 35 performs the stapling by the staple clinch 351 on the ends of the plurality of sheets aligned in contact with the rear end stopper 32. The stapler 35 is movable so as to perform binding on positions on the plurality of sheets instructed by the user via the control panel 5 of the image forming apparatus 2.

The ejector 36 is provided at an initial position at the upstream end of the processing tray 18. The ejector 36 is provided so as to overlap the rear end stopper 32 when viewed from a side view. The ejector 36 can move the sheet toward the downstream side in the conveyance direction. When moving the sheet to the downstream side in the conveyance direction, the ejector 36 advances the plurality of sheets on which the post-processing is performed. The ejector 36 disposes the ends of the plurality of sheets at a position where the sheets can be delivered to the bundle claw. The ejector 36 is biased toward the above-described initial position before the movement.

A bundle claw driving mechanism 23 for driving the bundle claw is configured by the bundle claw belt 39 and the belt pulleys 43a and 43b. The bundle claw driving mechanism 23 includes a bundle claw driving motor 45 as a driving source shared by the bundle claw (belt pulley 43a), the ejector 36, and the truster 36a. The bundle claw driving motor 45 is always connected to the belt pulley 43a. On the other hand, the bundle claw driving motor 45 is connected to the ejector 36 and the truster 36a via an electromagnetic clutch 46 such that it can be connected and disconnected.

When the belt pulley 43a is driven to rotate forward in the counterclockwise direction in the drawing, the bundle claw, the ejector 36, and the truster 36a move from the upstream side in the conveyance direction to the downstream side on the conveyance surface 18a. When the belt pulley 43a is driven to rotate reversely in the clockwise direction in the drawing, the bundle claw, the ejector 36, and the truster 36a move upstream in the conveyance direction on the conveyance surface 18a. The upstream side in the conveyance direction is the right side of FIG. 2.

The vertical alignment roller 40 conveys the sheet placed on the processing tray 18 toward the movable tray 14a of the discharge unit 14 by driving to rotate forward in the counterclockwise direction in the drawing. The vertical alignment roller 40 applies a driving force to the sheet placed on the processing tray 18 by coming into contact with the sheet from below. At this time, as illustrated in FIG. 2, when the sheet on the processing tray 18 is bent and separated from the vertical alignment roller 40, the driving force of the vertical alignment roller 40 cannot be applied to the sheet.

Therefore, a pinch roller 47 that sandwiches a sheet between the processing tray 18 and the vertical alignment roller 40 is provided as a pressing roller above the processing tray 18 (above the standby tray 17 in the embodiment).

The pinch roller 47 is a driven roller having no driving source. The pinch roller 47 is movable between a standby position located above the standby tray 17 and a rotation position facing the vertical alignment roller 40.

Figure 3:
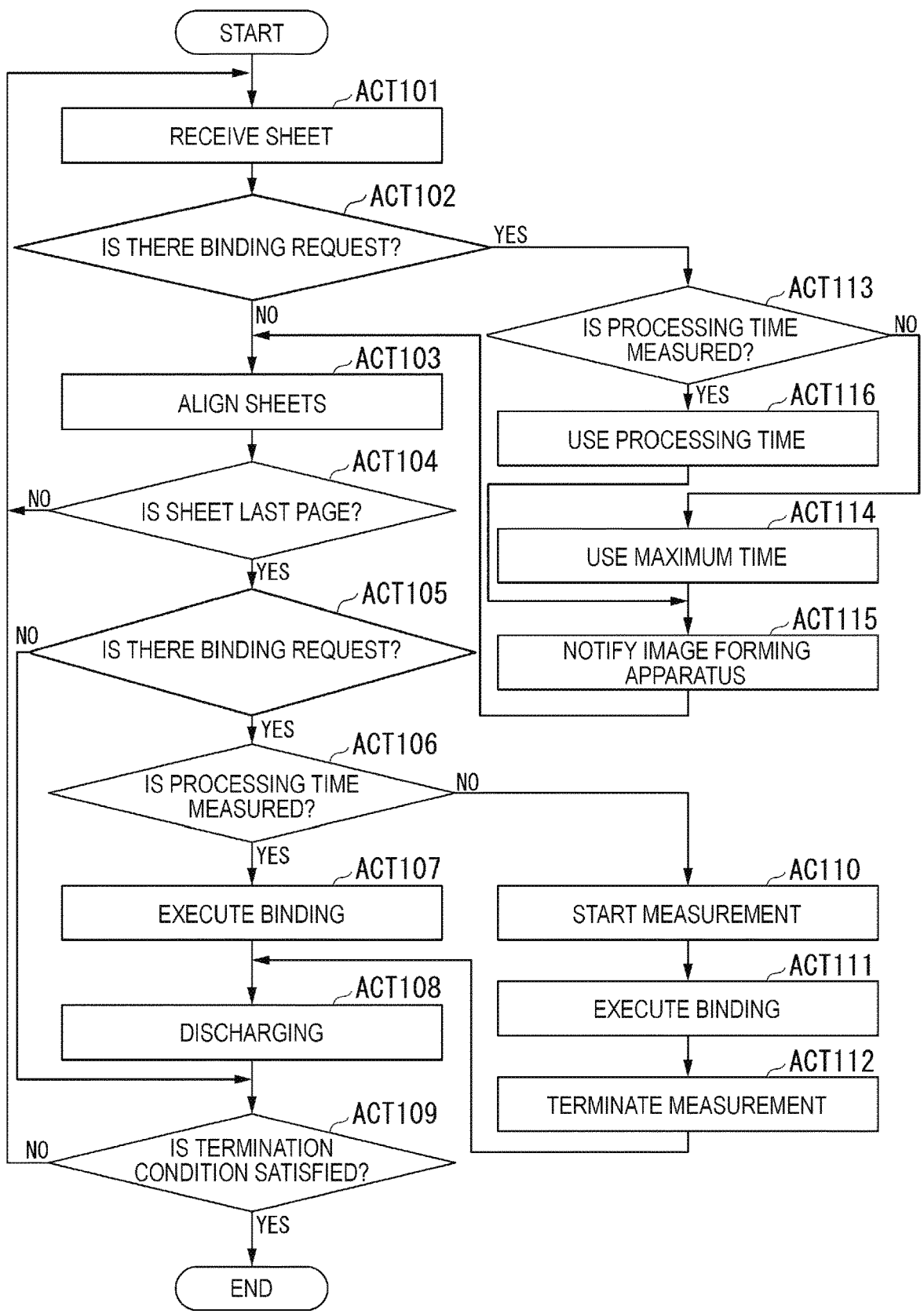
FIG. 3 is a flowchart illustrating a flow of post-processing performed by the sheet post-processing apparatus of at least one embodiment.

FIG. 3 is a flowchart illustrating a flow of post-processing performed by the sheet post-processing apparatus 3 of the embodiment.

The sheet post-processing apparatus 3 receives a sheet to be post-processed from the image forming apparatus 2 (ACT 101). The received sheets are stacked on the standby tray 17. The sheet post-processing apparatus 3 determines whether or not a processing request of the received sheet includes a binding request (ACT 102). When there is no binding request (ACT 102: NO), the sheet post-processing apparatus 3 aligns a plurality of sheets (ACT 103). Specifically, first, the standby unit 12 of the sheet post-processing apparatus 3 drops the plurality of retained sheets toward the processing unit 13 according to the instruction of the control unit 151. Thus, the plurality of sheets stacked on the standby tray 17 are stacked on the processing tray 18. Then, the processing unit 13 aligns the plurality of sheets by performing the aligning on the plurality of sheets placed on the processing tray 18.

The control unit 151 determines whether or not a last sheet stacked on the standby tray 17 is a last page (ACT 104). The determination as to whether or not the sheet is the last page is performed based on the post-processing information notified from the image forming apparatus 2. If the sheet is not the last page (ACT 104: NO), the sheet post-processing apparatus 3 executes the processing after ACT 101.

On the other hand, if the sheet is the last page (ACT 104: YES), it is determined whether or not there is a binding request (ACT 105). If there is a binding request (ACT 105: YES), the control unit 151 determines whether or not the processing time is measured (ACT 106). For example, when the processing time is stored in the memory 152, the control unit 151 determines that the measurement is complete. On the other hand, when the processing time is not stored in the memory 152, the control unit 151 determines that the measurement is not completed. If the processing time is measured (ACT 106: YES), the control unit 151 controls the stapler 35 to execute the binding (ACT 107).

The control unit 151 controls the processing unit 13 to execute discharging (ACT 108). Specifically, the control unit 151 discharges the sheet on which the binding is performed to the discharge unit 14. After that, the control unit 151 determines whether or not a termination condition is satisfied (ACT 109). The termination condition is a condition for terminating the post-processing by the sheet post-processing apparatus 3. For example, the termination condition may be that the number of times of post-processing included in the post-processing information is terminated, or that a termination instruction is given from outside. If the termination condition is satisfied (ACT 109: YES), the sheet post-processing apparatus 3 terminates the post-processing. After the post-processing is terminated, the control unit 151 deletes the processing time stored in the memory 152.

On the other hand, when the termination condition is not satisfied (ACT 109: NO), the sheet post-processing apparatus 3 executes the processing after ACT 101.

If the processing time is not measured in the processing of ACT 106 (ACT 106: NO), the control unit 151 starts the measurement of the processing time (ACT 110). Specifically, the control unit 151 starts the measurement of the processing time at the timing when the stapler 35 is instructed to execute the binding. The control unit 151 controls the stapler 35 to execute the binding (ACT 111). The control unit 151 terminates the measurement of the processing time at the timing when the binding is completed (ACT 112). The control unit 151 stores information on the measured processing time in the memory 152. Thereafter, the sheet post-processing apparatus 3 executes the processing after ACT 108.

In the processing of ACT 105, when there is no binding request (ACT 105: NO), the sheet post-processing apparatus 3 executes the processing after ACT 109.

If there is no binding request in the processing of ACT 102 (ACT 102: NO), the control unit 151 determines whether or not the processing time is measured (ACT 113). If the processing time is not measured (ACT 113: NO), the control unit 151 determines to use the maximum time as the processing time (ACT 114). The communication unit 153 notifies the image forming apparatus 2 of the post-processing time including the processing time (ACT 115). For example, the control unit 151 adds the time required for each of the sheet alignment, the binding, and the discharging to the sheet discharge tray. The time required for each of the sheet alignment and the discharging to the sheet discharge tray is determined in advance. If it is determined that the maximum time is used as the processing time, the control unit 151 adds the time required for each of the sheet alignment, the maximum time, and the discharging to the sheet discharge tray. Thereby, the control unit 151 calculates the post-processing time. Then, the control unit 151 controls the communication unit 153 to notify the image forming apparatus 2 of the calculated post-processing time.

Thereby, the post-processing time is notified to the image forming apparatus 2. The communication unit 403 of the image forming apparatus 2 receives the post-processing time information notified from the sheet post-processing apparatus 3. Then, at the timing when the post-processing time included in the received post-processing time information elapses, the control unit 401 discharges the sheet to be post-processed to the sheet post-processing apparatus 3. Thus, the sheet to be post-processed can be discharged to the sheet post-processing apparatus 3 at the timing when the post-processing of the sheet post-processing apparatus 3 is terminated. Thereafter, the sheet post-processing apparatus 3 executes the processing after ACT 103.

On the other hand, when the processing time is measured (ACT 113: YES), the control unit 151 determines to use the measured time as the processing time (ACT 116). In this case, the control unit 151 reads the measured time from the memory 152. Then, the communication unit 153 notifies the image forming apparatus 2 of the post-processing time including the processing time (ACT 115). If it is determined that the measured time is used as the processing time, the control unit 151 adds the time required for each of the sheet alignment, the measured time, and the discharging to the sheet discharge tray. Thereby, the control unit 151 calculates the post-processing time. Then, the control unit 151 controls the communication unit 153 to notify the image forming apparatus 2 of the calculated post-processing time. Thereafter, the sheet post-processing apparatus 3 executes the processing after ACT 103.

According to the exemplary embodiment of the sheet post-processing apparatus 3 described above, it is possible to reduce the waiting time before performing next post-processing. For example, when performing the binding a plurality of times (e.g., multiple time periods) continuously, the sheet post-processing apparatus 3 first measures the processing time required for the binding during the first binding. Then, the sheet post-processing apparatus 3 notifies the image forming apparatus 2 of the post-processing time including the measured processing time. That is, when a plurality of copies of the same job are discharged, the sheet post-processing apparatus 3 measures the binding time performed in the first copy and reflects the time in the binding time performed in the next job. As a result, the processing can be performed by changing the processing time according to the number of sheets to be bound, the type of the sheets, and the like, instead of the fixed time as in the related art. Therefore, if the binding is completed earlier than the maximum time, the subsequent post-processing can be processed earlier by that amount. Therefore, the waiting time can be reduced. As a result, the time required for the discharging operation can be reduced.

The sheet post-processing apparatus 3 causes the stapler 35 to execute the binding without measuring the processing time in the second and subsequent binding among the continuous binding. As a result, post-processing can be performed in the same job with one time of measurement. Therefore, the sheet post-processing apparatus 3 can efficiently perform post-processing in the same job.

If the processing time is not measured, the sheet post-processing apparatus 3 notifies the image forming apparatus of a post-processing time including the preset time as the processing time. Thus, even when the processing time is not measured, the post-processing time can be communicated to the image forming apparatus 2. Therefore, it is possible to continuously execute the next post-processing.

The sheet post-processing unit 3 starts the measurement of the processing time at the timing when the stapler 35 is instructed to execute the binding and terminates the measurement of the processing time at the timing when the binding is completed. Thus, it is possible to measure an accurate time required for the binding. Therefore, the sheet post-processing apparatus 3 can calculate a more accurate post-processing time.

The sheet post-processing apparatus 3 deletes the processing time stored in the memory 152 after the continuous binding terminates. Thus, when a new job is input, only the processing time of the input job can be stored in the memory 152. Therefore, the processing time of another job is not erroneously used. As a result, the processing time corresponding to the input job is used.

The sheet post-processing apparatus 3 calculates the post-processing time by adding the time required for each of at least the sheet alignment, the binding, and the discharging to the sheet discharge tray. That is, the sheet post-processing apparatus 3 calculates the post-processing time by adding all the times required for not only the binding but also the post-processing. As a result, it is possible to calculate a more accurate time when the post-processing of one copy is completed in the sheet post-processing apparatus 3. Therefore, the image forming apparatus 2 can convey the next sheet to be processed at the timing when the post-processing of one copy is completed in the sheet post-processing apparatus 3.

A part of the functions of the image forming apparatus and the sheet post-processing apparatus 3 in the above-described embodiment may be realized by a computer. In that case, a program for realizing these functions is recorded on a computer-readable recording medium. Then, the functions may be realized by causing a computer system to read and execute a program recorded on a recording medium in which the above-described program is recorded. The "computer system" referred to here includes hardware such as an operating system and peripheral equipment. In addition, "computer-readable recording medium" refers to a portable medium, a storage device, or the like. The portable medium is a flexible disk, magneto-optical disk, ROM, CD-ROM or the like. In addition, the storage device is a hard disk built in the computer system or the like. Further, the "computer-readable recording medium" dynamically holds a program for a short time, such as a communication line for transmitting a program via a communication line. The communication line is a network such as the Internet, a telephone line, or the like. The "computer-readable recording medium" may be a volatile memory inside a computer system serving as a server or a client. The volatile memory holds a program for a certain period of time. The above-described program may be for realizing a part of the above-described functions. Further, the above-described program may be realized by combining the above-described functions with a program already recorded in the computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sheet post-processing apparatus comprising:
   a controller configured to:
      communicate with an image forming apparatus;
      measure a processing time for binding a first plurality of sheets conveyed to the sheet post-processing apparatus by the image forming apparatus during a first binding of a plurality of continuous bindings;
      notify the image forming apparatus of a post-processing time including the processing time; and
      cause a stapler to execute a second binding of the plurality of continuous bindings to bind a second plurality of sheets conveyed to the sheet post-processing apparatus by the image forming apparatus without measuring the processing time.

2. The sheet post-processing apparatus according to claim 1,
   wherein, responsive to determining that the processing time of the first binding is not measured, the controller is configured to notify the image forming apparatus of a post-processing time including a preset time as the processing time.

3. The sheet post-processing apparatus according to claim 2,
   wherein, responsive to determining that the processing time is not measured, after notifying the image forming apparatus of the post-processing time including the preset time as the processing time, the controller is configured to measure a processing time required for the second binding.

4. The sheet post-processing apparatus according to claim 1, wherein the controller is configured to:
   start measurement of the processing time required for binding when the stapler is instructed to execute the binding; and
   terminate measurement of the processing time required for the binding when the binding is completed.

5. The sheet post-processing apparatus according to claim 1, further comprising:
   a memory configured to store the processing time required for the first binding,
   wherein the controller is configured to delete the processing time required for the first binding stored in the memory after the plurality of continuous bindings is terminated.

6. The sheet post-processing apparatus according to claim 1,
   wherein the controller is configured to calculate the post-processing time by adding time required for each of at least a sheet alignment, the binding, and discharge to a sheet discharge tray.

7. The sheet port-processing apparatus according to claim 6,
   further comprising at least one alignment plate configured to perform the sheet alignment by adjusting a position of ends of the plurality of sheets in a length direction and a width direction.

8. The sheet post-processing apparatus according to claim 6,
   further comprising a discharger configured to discharge a sheet bundle to a sheet discharge tray.

9. The apparatus according to claim 2,
   wherein the controller is configured to use an assumed required maximum time for the stapler to perform the first binding of the first plurality of sheets as the preset time.

10. An image forming system comprising:
    a sheet post-processing apparatus including:
       a controller configured to measure a processing time for binding a set of sheets, and
       output a notification to an image forming apparatus relating to a post-processing time including the processing time; and
    the image forming apparatus, which is configured to output sheets on which images are formed to the sheet post-processing apparatus to perform post-processing,
    the sheet post-processing apparatus being configured to:
       notify the image forming apparatus of a post-processing time including a preset time as the processing time responsive to determining that the processing time for the binding has not yet been measured during one of a plurality of continuous bindings, and
       measure, when performing the plurality of continuous bindings, the processing time required for the binding during at least the first binding a respective one of the plurality of continuous bindings and notify the image forming apparatus of the post-processing time including the processing time; and
    the image forming apparatus being configured to output a subsequent set of sheets to the sheet post-processing apparatus when the post-processing time notified from the sheet post-processing apparatus elapses.

11. The image forming system according to claim 10,
    wherein, responsive to notifying the image forming apparatus of the post-processing time including the processing time that was measured during the respective one of the plurality of bindings, the controller is further configured to cause a stapler to execute a subsequent binding of the plurality of continuous bindings after the respective one of the plurality of bindings without measuring the processing time.

12. The sheet post-processing apparatus according to claim 10,
wherein, responsive to notifying the image forming apparatus of the post-processing time including the preset time as the processing time, the controller is configured to measure a processing time required for a subsequent binding of the plurality of continuous bindings.

13. A post-processing notification method for an image forming apparatus comprising:
measuring, by a controller, a processing time required for binding a respective set of a plurality of sheets of paper conveyed to a sheet post-processing apparatus by the image forming apparatus during a respective binding of a plurality of continuous bindings;
notifying, by the controller, the image forming apparatus of a post-processing time including the processing time of the respective binding; and
causing, by the controller, a stapler to execute a subsequent binding of the plurality of continuous bindings following the respective binding to bind a subsequent set of the plurality of sheets of paper conveyed to the sheet post-processing apparatus by the image forming apparatus after the respective set of the plurality of sheets without measuring the processing time.

14. The method according to claim 13, further comprising:
aligning a position of ends of the respective set of the plurality of sheets in a length direction and a width direction;
discharging the respective set of the plurality of sheets following completion of the respective binding to a sheet discharge tray; and
calculating the post-processing time by adding a time required for at least one of the aligning or the discharging to the processing time for the respective binding.

15. The method according to claim 13, further comprising:
causing, by the controller, the stapler to perform a prior binding of the plurality of continuous bindings on a prior set of the plurality of sheets conveyed to the sheet post-processing apparatus by the image forming apparatus before the respective set of the plurality of sheets;
notifying, by the controller, the image forming apparatus of the post-processing time including a preset time as the processing time; and
causing, by the controller, the stapler to perform the respective binding on the respective set of the plurality of sheets conveyed to the sheet post-processing apparatus by the image forming apparatus after the prior set of the plurality of sheets.

16. The method according to claim 13, wherein measuring the processing time comprises:
starting measurement of the processing time required for a binding at a time when the stapler is instructed to execute the binding; and
terminating measurement of the processing time required for the binding at a time when the binding is completed.

17. The method according to claim 16, further comprising:
storing, in a memory, the processing time measured for the respective binding; and
deleting, from the memory, the processing time required for the respective binding after the plurality of continuous bindings terminates.

* * * * *